US010724215B2

United States Patent
Darocha et al.

(10) Patent No.: US 10,724,215 B2
(45) Date of Patent: Jul. 28, 2020

(54) FAUCET FIXATION SYSTEM

(71) Applicant: Kohler Co., Kohler, WI (US)

(72) Inventors: Matthieu Darocha, Reims (FR); Anaël Tasserit, Trigny (FR); Mickaël Nollet, Mourmelon le Grand (FR); Benoit Lagaude, Barisis (FR)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 16/122,605

(22) Filed: Sep. 5, 2018

(65) Prior Publication Data

US 2019/0071848 A1    Mar. 7, 2019

Related U.S. Application Data

(60) Provisional application No. 62/554,714, filed on Sep. 6, 2017.

(51) Int. Cl.
*E03C 1/04* (2006.01)
*F16B 37/08* (2006.01)

(52) U.S. Cl.
CPC ........ *E03C 1/0401* (2013.01); *F16B 37/0857* (2013.01); *F16B 37/0864* (2013.01); *E03C 2001/0416* (2013.01)

(58) Field of Classification Search
CPC ................. E03C 1/0401; E03C 1/0402; E03C 2001/0416; Y10T 137/6977; F16L 37/1215; F16L 37/025; F16L 37/0841; F16L 37/0842; F16L 37/105; F16L 37/26; F16B 37/0864; F16B 37/0857; F16B 37/0807
See application file for complete search history.

(56) References Cited

U.S. PATENT DOCUMENTS

| 1,915,588 | A | 6/1933 | Arrington |
|---|---|---|---|
| 3,815,434 | A | 6/1974 | Seger |
| 4,132,146 | A | 1/1979 | Raimer |
| 4,281,857 | A | 8/1981 | Bruce |
| 4,990,044 | A | 2/1991 | Kimak |
| 5,152,651 | A | 10/1992 | Arteon |
| 5,465,749 | A | 11/1995 | Sauter et al. |

(Continued)

FOREIGN PATENT DOCUMENTS

DE    102015001562    8/2016

OTHER PUBLICATIONS

European Search Report re Application No. EP18192820; 5 pgs.

*Primary Examiner* — Erin Derry
(74) *Attorney, Agent, or Firm* — Foley & Lardner LLP

(57) ABSTRACT

A faucet fixation system that includes a fastener and a connector having a base and a nut assembly. The base has a longitudinal bore receiving the fastener and a radial bore. The nut assembly is disposed in the radial bore and includes first and second locking members each having threaded and actuating portions disposed on opposite sides of the fastener. In a locking position, at least one locking member is moved relative to the base such that the threaded portions engage the fastener to prohibit relative sliding movement between the connector and the fastener while allowing the connector to rotate along the threads of the fastener. In a non-locking position, at least one locking member is moved relative to the base such that the threaded portions disengage the fastener to allow movement of the connector relative to the fastener.

20 Claims, 8 Drawing Sheets

(56) References Cited

U.S. PATENT DOCUMENTS

| | | | |
|---|---|---|---|
| 6,001,250 | A | 12/1999 | Schorn et al. |
| 6,015,171 | A | 1/2000 | Schorn |
| 6,378,911 | B1 | 4/2002 | Grohe |
| 6,571,407 | B1 | 6/2003 | Skarie |
| 6,729,349 | B2 | 5/2004 | Brandebusemeyer |
| 6,953,314 | B2 | 10/2005 | Magagna |
| 7,338,242 | B2 | 3/2008 | Ellis et al. |
| 7,735,667 | B2 | 6/2010 | Schutz |
| 8,231,318 | B2 | 7/2012 | Pitsch et al. |
| 8,272,083 | B1 | 9/2012 | Liston et al. |
| 8,297,903 | B2 | 10/2012 | Hohmann et al. |
| 9,371,634 | B2 | 6/2016 | Flessa et al. |
| 10,094,499 | B2 * | 10/2018 | Chintalapati ....... F16L 37/0841 |
| 2006/0039776 | A1 | 5/2006 | Schutz |
| 2006/0101576 | A1 * | 5/2006 | Rhodes ................. E03C 1/0401 |
| | | | 4/695 |
| 2007/0207010 | A1 | 9/2007 | Caspi |
| 2014/0182708 | A1 * | 7/2014 | Ye ........................ E03C 1/0401 |
| | | | 137/315.01 |
| 2016/0244952 | A1 | 8/2016 | Stoelzel |
| 2016/0265675 | A1 | 9/2016 | Loi et al. |

* cited by examiner

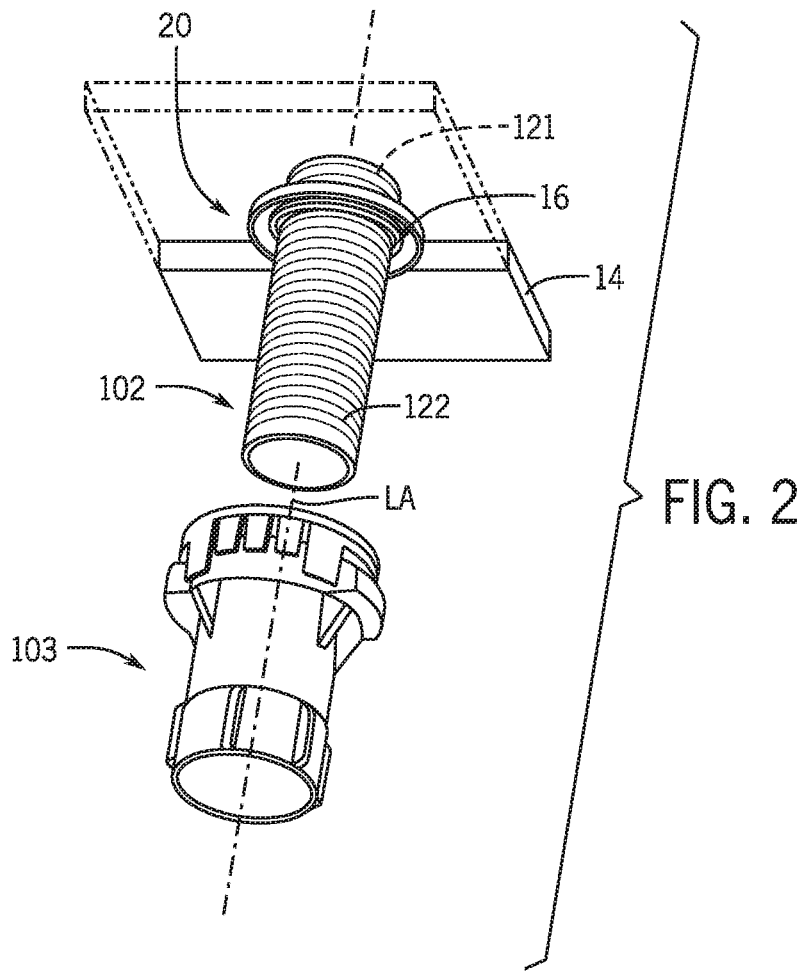
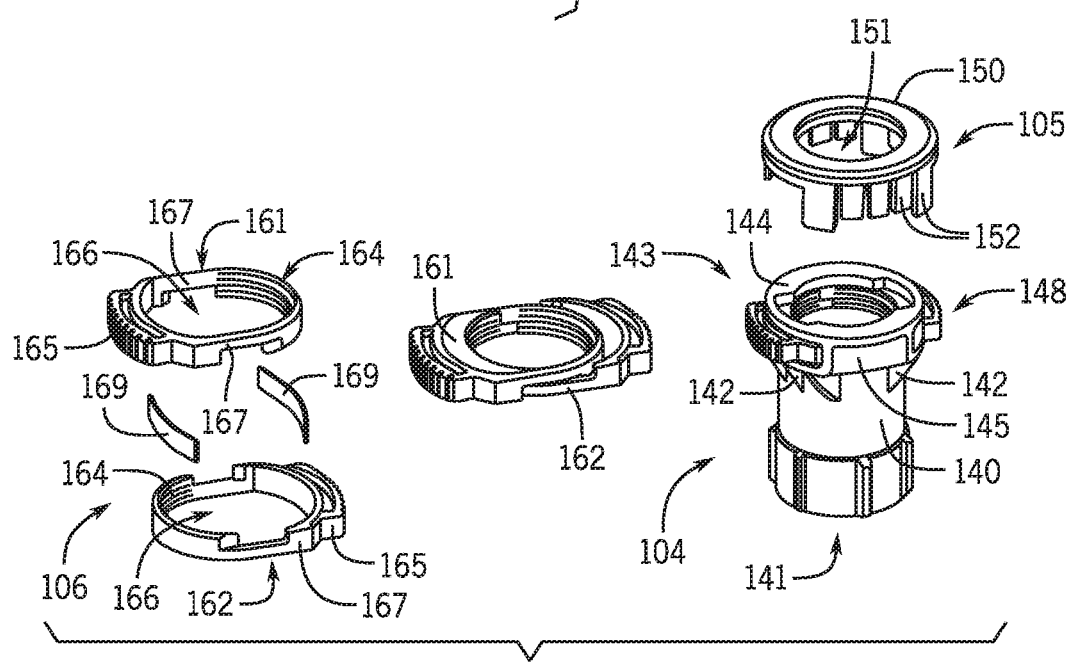

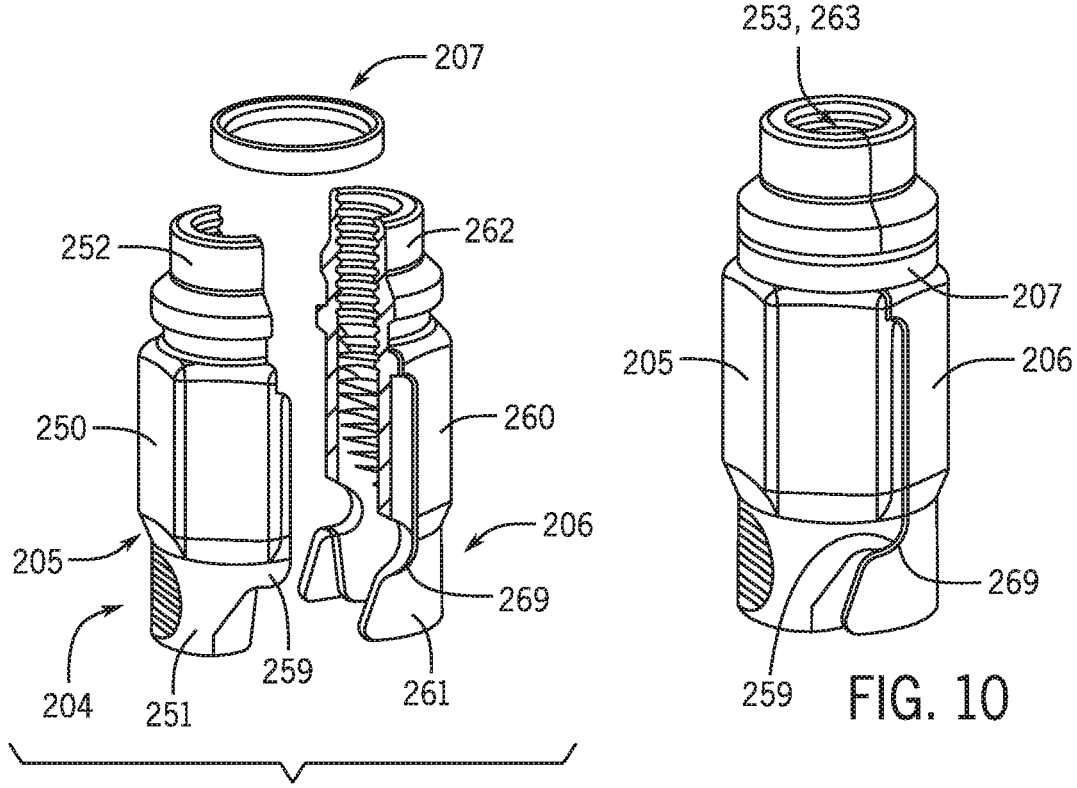
FIG. 9
FIG. 10
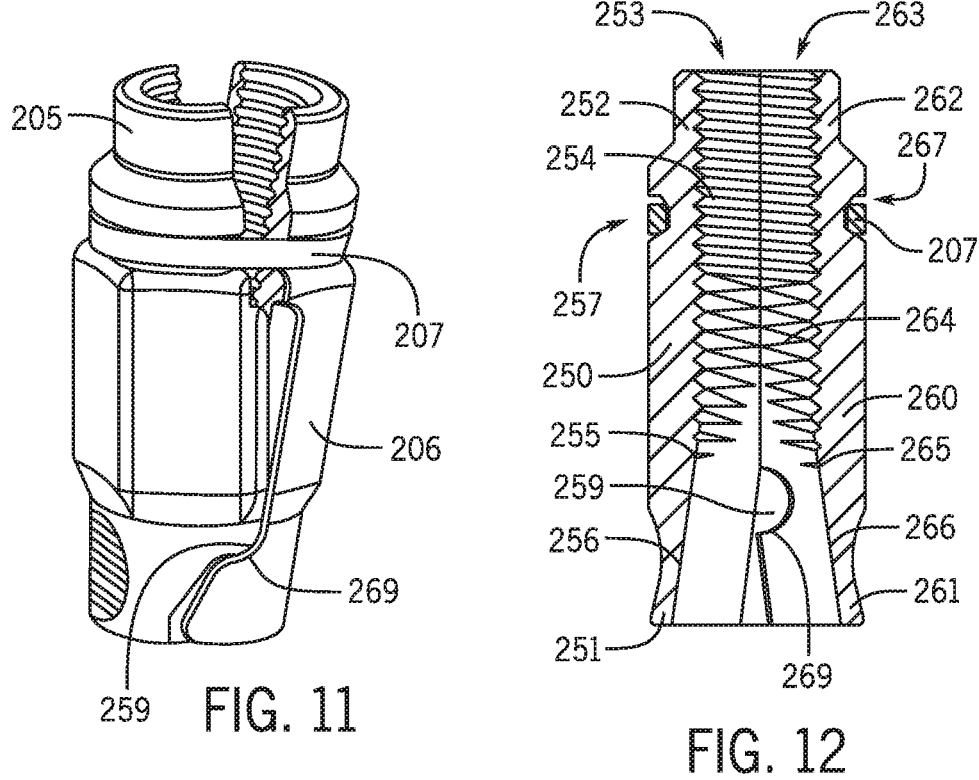
FIG. 11
FIG. 12

FAUCET FIXATION SYSTEM

CROSS-REFERENCE TO RELATED APPLICATIONS

The present application claims the benefit of and priority to U.S. Patent App. No. 62/554,714, filed on Sep. 6, 2017, which is incorporated by reference herein in its entirety.

BACKGROUND

The present application relates generally to the field of systems for fixing faucets in place, such as to a sink, countertop, or other suitable device. More specifically, this application relates to faucet fixation systems having quick connectors to simplify and shorten the installation process of the faucet.

SUMMARY

At least one embodiment of the present application relates to a faucet fixation system that includes a fastener and a connector. The fastener is configured to extend through a support structure of a faucet. The connector includes a base, which has a longitudinal bore receiving the fastener and a radial bore extending transversely through the longitudinal bore, and a nut assembly disposed in the radial bore and around the fastener. The nut assembly includes a first locking member, which has a first threaded portion and a first actuating portion disposed on opposite sides of the fastener, and a second locking member, which has a second threaded portion and a second actuating portion disposed on opposite sides of the fastener. In a locking position of the connector, the first and second threaded portions engage threads of the fastener to prohibit a relative sliding movement between the connector and the fastener in a longitudinal direction while allowing the connector to rotate along the threads of the fastener (e.g., to thread to the fastener). In a non-locking position of the connector, the first and second threaded portions disengage the threads of the fastener to allow movement of the connector relative to the fastener in the longitudinal direction. In moving from the non-locking position to the locking position, each threaded portion moves toward the fastener and each actuating portion moves away from the fastener.

At least one embodiment relates to a faucet fixation quick connector that includes a base, a first locking member, and a second locking member. The base has a longitudinal bore, which extends along a longitudinal axis and is configured to receive a faucet fastener, and a radial bore, which extends in a radial direction. The first locking member is disposed in the radial bore and is configured to move relative to the base in the radial direction. The first locking member includes a threaded portion and an actuating portion provided on opposite sides of the longitudinal axis. The second locking member is disposed in the radial bore and is configured to move relative to the base in the radial direction. The second locking member includes a threaded portion and an actuating portion provided on opposite sides of the longitudinal axis. In a locking position, the threaded portions of the first and second locking members are configured to secure the connector to the fastener to prohibit a movement of the connector relative to the faucet fastener in the longitudinal direction. In a non-locking position, the threaded portions of the first and second locking members are configured to be disconnected from the fastener to allow free movement of the connector relative to the fastener. Each of the first and second locking members is moved from the locking position to the non-locking position by depressing the actuating portion toward the fastener relative to the base.

At least one embodiment relates to a faucet fixation method that includes placing a faucet on top of a support structure with a threaded rod of the faucet extending through a hole in the support structure to beneath the support structure; moving a quick connector into a non-locking position by pressing at least one actuating portion of the first and second locking members of the quick connector to disengage threaded portions of the first and second locking members from the threaded rod; sliding the quick connector in a longitudinal direction over the threaded rod until a portion of the quick connector rests against an underside of the support structure; and releasing each actuating portion such that the quick connector moves into a locking position with the threaded portions of the first and second locking members engaging the threaded rod to prohibit a sliding movement of the quick connector relative to the threaded rod in the longitudinal direction while allowing threaded rotation of the quick connector along the threaded rod. The faucet fixation method can also include rotating the quick connector relative to the threaded rod through a threaded connection between the threaded portions and the threaded rod while in the locking position to secure the quick connector in place and to move a base, the first locking member, and the second locking member of the quick connector toward a clip that abuts the underside of the support structure such that fingers of the clip engage openings in the base. Pressing the at least one actuating portion can be configured to slide the associated locking member in a radial direction in a radially extending bore of the quick connector, and the radial direction can be configured transverse to the longitudinal direction.

At least one embodiment relates to a faucet including a faucet fixation system, as disclosed in this application. The faucet may be a kitchen faucet as well as a bath faucet.

BRIEF DESCRIPTION OF THE DRAWINGS

FIG. 2 is a perspective view of the faucet fixation system shown in FIG. 1 prior to assembly and without the faucet.

FIG. 3 is an exploded view of a portion of the faucet fixation system shown in FIG. 2.

FIG. 9 is an exploded perspective view of another exemplary embodiment of a connector of a faucet fixation system for securing a faucet to a support structure.

FIG. 10 is a perspective view of the connector shown in FIG. 9 in a locking position.

FIG. 11 is a perspective view of the connector shown in FIG. 9 in a non-locking position.

FIG. 12 is a cross-sectional side view of the connector shown in FIG. 10.

DETAILED DESCRIPTION

Faucets are secured in place using fixation kits or systems. One such kit or system involves using a threaded nut to thread to a threaded rod. The nut is a solid, unitary element that threads to the threaded fastener by way of the bottom end of the fastener until secured against a holding flange. However, this type of system has several issues. One such issue is that before tightening the nut, the faucet does not stay in place (e.g., in the hole in the sink, countertop, or other support to which the faucet is mounted) and the installer has to keep the faucet in place by hand until the nut is in place. This is cumbersome for the installer due to the faucet being above the support and the nut being threaded below the support. Also before tightening the nut onto the threaded rod, the flange doesn't stay in place on the thread rod and the installer has to keep it in place by hand. Trying to hold the faucet and the holding member in place while threading the nut over the rod can be particularly cumbersome and time consuming. Also, since the nut has to be threaded the entire length of the rod, the time needed to screw the nut into locking arrangement with the holding member is long for the installer.

Now, referring generally to the FIGURES, disclosed in this application are faucet fixation systems (e.g., faucet fixation assemblies) that are configured to secure a faucet, a faucet handle, or other suitable water delivery device or component to a support structure. The systems disclosed in this application advantageously simplify the installation of faucets (or components thereof), such as, for example, by reducing the time it takes to install the faucet and making it less cumbersome for the installer.

Figure 1:
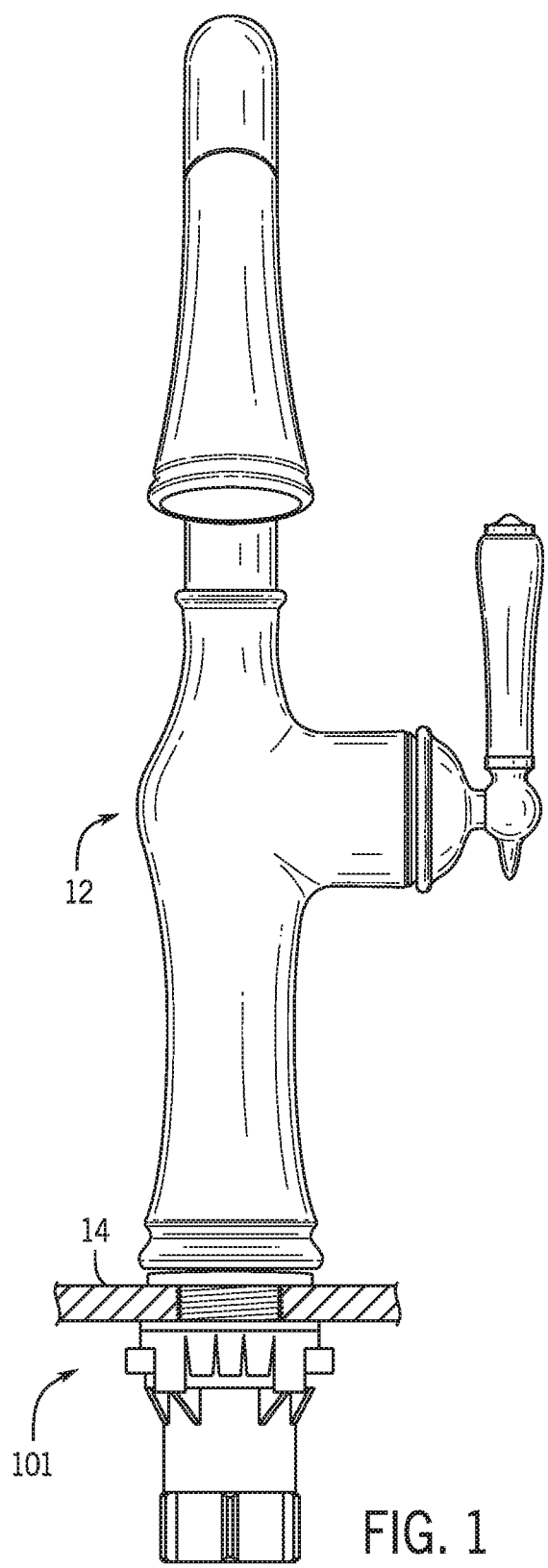
FIG. 1 is a perspective view of an exemplary embodiment of a faucet fixation system coupling a faucet to a support structure.

FIG. 1 illustrates an exemplary embodiment of a faucet fixation system 101 coupling a faucet 12 to a support structure 14. The support structure 14 can be a sink (e.g., the rim, the deck, etc.), a countertop, or any other suitable structure that supports a faucet. Although the support structure 14 is generally depicted as a cuboidal element, the faucet fixation systems disclosed in this application can couple the faucet to structures having other geometric shapes. Further, the faucet 12 depicted is only an example of a kitchen faucet and all other kitchen faucets, as well as other types of faucets (e.g., bathroom faucets) can be secured to any object using the fixation systems disclosed in this application. The faucet 12 includes a base (e.g., body, lower portion, etc.), which is configured to mount on top of the support structure 14, and a spout (e.g., upper portion), which extends away from the base and is configured to discharge water. The base of the faucet 12 can be configured to receive a fastener (e.g., the fastener 102, the fastener 202, etc.) from an underside of the base. For example, the fastener can thread to internal threads of a body of the base.

FIGS. 2-8 illustrate an exemplary embodiment of the faucet fixation system 101 for use in coupling a faucet, such as the faucet 12, to a support structure, such as the support structure 14. As shown in FIG. 2, the faucet fixation system 101 includes a fastener 102 (e.g., threaded rod, bolt, etc.), which is configured to be coupled to the faucet and configured to extend beneath the support structure 14, and a connector 103 (e.g., quick connector), which is configured to quickly engage/disengage the fastener 102 to secure/unsecure the faucet and fastener 102 to the support structure 14.

As shown in FIG. 2, the fastener 102 is threaded and is configured to extend through a hole 16 in the support structure 14 such that a first end 121 of the fastener 102 is coupled to the faucet or an element coupled to the faucet. The fastener 102 also has a second end 122 that is opposite the first end 121 and is configured to receive the connector 103 to couple the connector 103 to the fastener 102. The fastener 102 has external threads. As shown in FIG. 2, the fastener 102 is configured as a sleeve having a cylindrical wall with a bore 123 extending through the wall with threads disposed around the external surface. The sleeve and the bore 123 extend generally along a longitudinal axis LA from the first end 121 to the second end 122.

The connector 103 is configured to selectively couple to/decouple from the fastener 102 to secure the faucet to the support structure. The connector 103 is configured to engage the threads of the fastener 102 when the connector 103 is in a locking position (e.g., locking condition, locking mode of operation, etc.) to prohibit a relative sliding movement (e.g., translation) between the connector 103 and the fastener 102 in an axial direction (e.g., along the longitudinal axis LA) while allowing threaded rotation of the connector 103 about the threads of the fastener 102 (e.g., the connector 103 to thread to the fastener 102). Thus, the connector 103 can be threaded to the fastener 102 is in the locking position, but cannot be slid (e.g., translated) relative to the fastener 102. The connector 103 is configured to disengage the threads of the fastener 102 in a non-locking position to allow quick movement (e.g., sliding, translation) of the connector 103 along the axial direction/longitudinal axis LA relative to the fastener 102.

As shown in FIG. 3, the connector 103 includes a base 104 (e.g., body, etc.), a clip 105, and a nut assembly 106 that is retained between the base 104 and the clip 105 and is configured to engage/disengage the fastener 102 in the locking/non-locking positions, respectively. Also shown, the nut assembly 106 includes a first locking member 161 (e.g., upper locking member) and a second locking member 162 (e.g., lower locking member) that cooperate to selectively couple to and decouple from the fastener 102. As shown, the second locking member 162 is configured substantially similar to the first locking member 161, so only the first locking member 161 is described and it should be understood that the second locking member 162 includes the same/similar elements/features where labeled using the same reference numerals.

The first locking member 161 includes a threaded portion 164 and an actuating portion 165 located on opposite sides of a bore 166, which receives the fastener 102 upon assembly of the connector 103 to the fastener 102. The first locking member 161 also includes two side portions 167 interconnecting the threaded and actuating portions 164, 165 with the bore 166 located between the two side portions 167. Thus, after assembly, the threaded portion 164 and the actuating portion 165 are positioned on opposite sides of the fastener 102. The threaded portion 164 includes internal threads that are configured to selectively engage threads of the fastener 102 in a locking position and disengage the threads of the fastener 102 in a non-locking position. The threads of the threaded portion 164 of each locking member extend circumferentially less than or equal to about one-hundred eighty degrees (180°), since the threads of both locking members cooperate in the locking position to engage the fastener 102, as discussed below in more detail. The actuating portion 165 includes a projection extending radially outward to allow a user (e.g., installer) to move the locking member by pressing the projection (toward the fastener 102 when assembled). As shown, the projection of the actuating portion 165 includes external gripping features (e.g., splines, teeth, corrugations, etc.) to make it easier for the user to grasp/press the actuating portion 165. The side portions 167 elongate the locking member such that the bore 166 is elongated (e.g., elliptical) rather than round to allow the locking member to move (e.g., slide) relative to the fastener 102 to engage/disengage the threads of the fastener 102, as discussed below. Each side portion 167 has a cut-out to facilitate nesting between the first and second locking members 161, 162, as shown in FIG. 3, with the threaded portion of each locking member nested within the actuating portion of the other locking member. The cut-out in each side portion 167 allows a portion (e.g., the side portion) of the other locking member to engage the cut-out. This arrangement advantageously requires a relatively smaller package space while providing a simple actuation method of depressing the actuating portions 165 either individually or together (e.g., squeezing them toward one another).

The nut assembly 106 may include one or more biasing members configured to bias the first and second locking members 161, 162. As shown in FIG. 3, two springs 169 (e.g., leaf springs) bias the first and second locking members 161, 162 in a closing direction, i.e., toward the locking position with a first spring 169, which is disposed between (and acts to separate) the actuating portion 165 of the first locking member 161 and the threaded portion 164 of the second locking member 162, and a second spring 169, which is disposed between (and acts to separate) the actuating portion 165 of the second locking member 162 and the threaded portion 164 of the first locking member 161. Thus, a user has to overcome the biasing force of the springs 169 to move the locking members to the non-locking position, as the biasing force acts to maintain engagement of the threaded portions 164 and the threads of the fastener 102.

The base 104 of the connector 103 includes a generally cylindrical body 140 (e.g., sleeve) having a longitudinal bore 141 extending through the body 140. Extending from two opposite sides of the body 140 are ledges 142 configured to support the locking members of the nut assembly 106. Each ledge 142 protrudes radially outward from an outer surface of the body 140. Each ledge 142 has a width, which is sized based on a width of the associated locking member 161, 162, and has an outer diameter, which is greater than the outer diameter of the body 140. The body 140 and the ledges 142 may generally define a lower portion of the base 104. Also shown in FIG. 3, the base 104 includes an upper portion 143 extending up from the ledges 142. The upper portion 143 includes an annular top 144 that is offset from and is provided above the ledges 142. An opening extends through the top 144 for receiving the fastener 102. Sides 145 of the upper portion 143 couple the top 144 to the base 104, such as the body 140 and/or the ledges 142. Extending transversely to the longitudinal bore 141 between the top 144, the sides 145, and the ledges 142 is a radial bore 148 in which the locking members 161, 162 of the nut assembly 106 move (e.g., slide, translate, etc.) within relative to the base 104 between the locking and non-locking positions. Thus, the radial bore 148 is defined in part by the upper portion 143 (e.g., top 144, sides 145) and in part by the lower portion of the base (e.g., body 140, ledges 142).

The clip 105 of the connector 103 helps secure the connector 103 in place on the fastener 102, as discussed below. As shown in FIG. 3, the clip 105 includes an annular base 150 having a central opening 151 configured to receive the fastener 102. Extending downwardly from a bottom of the base 150 is a plurality of external fingers 152 configured to extend around portions of the base 104 (e.g., portions of the upper portion 143) to couple the clip 105 and the base 104 and/or retain the locking members 161, 162 in the radial bore 148. As shown best in FIGS. 7 and 8, the clip 105 also includes a plurality of internal fingers 154 that are configured to engage the nut assembly 106 in the locking position to help maintain engagement of the threads of the locking members 161, 162 with the threads of the fastener 102, which is discussed below in more detail.

Figure 4:
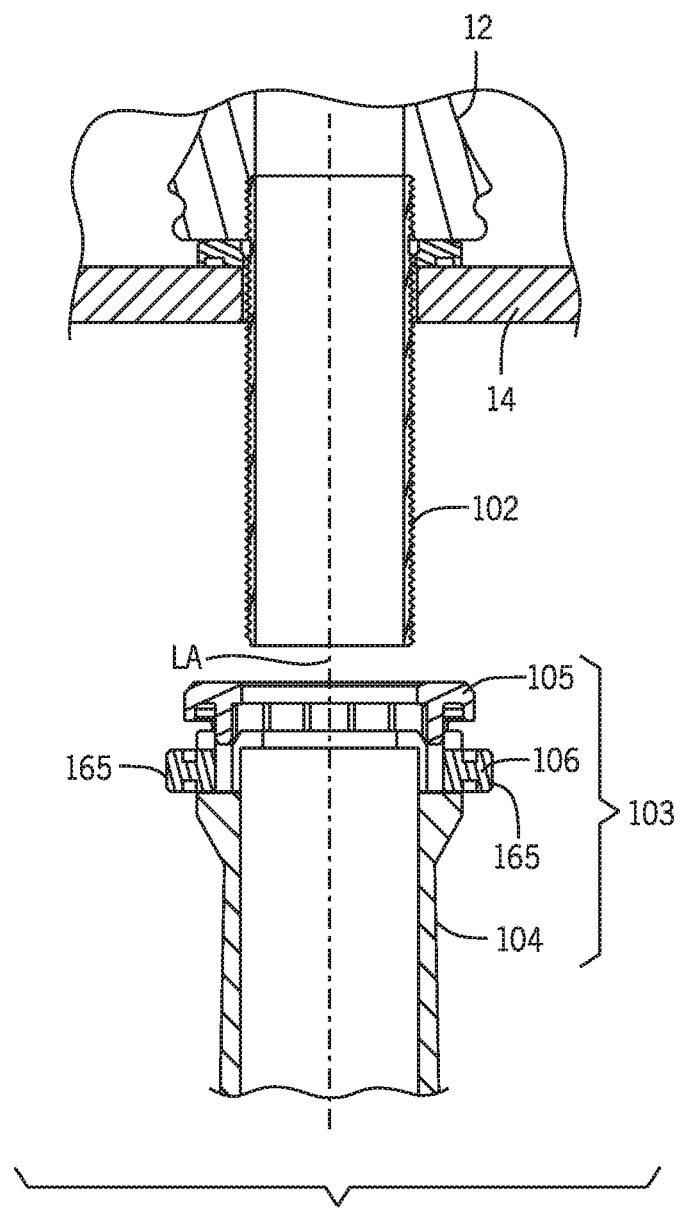
FIG. 4 is a side view of the faucet fixation system shown in FIG. 2 in a partially assembled position.
Figure 5:
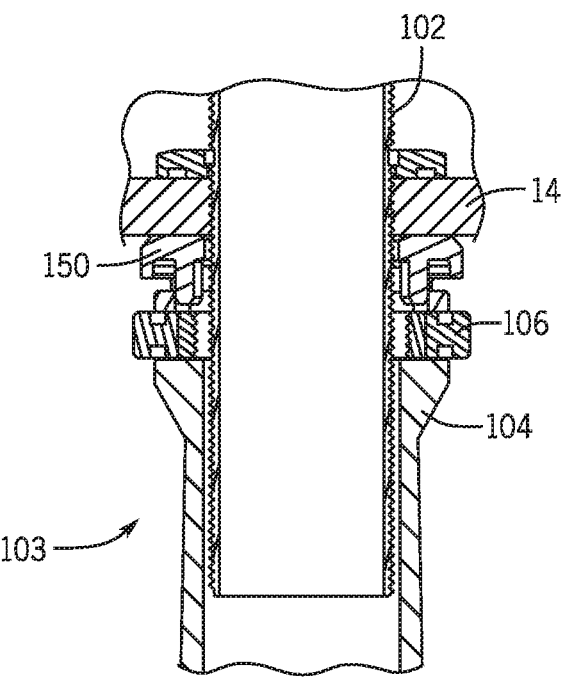
FIG. 5 is a side view of the faucet fixation system shown in FIG. 2 in a partially assembled position.
Figure 6:
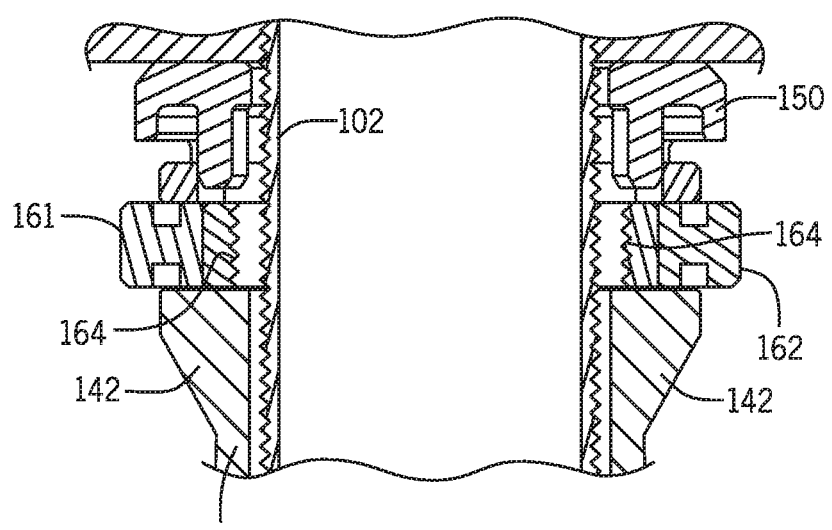
FIG. 6 is a detail view of the faucet fixation system shown in FIG. 5.

FIGS. 4-8 illustrate an exemplary method of coupling the connector 103 to the fastener 102 to secure a faucet (e.g., the faucet 12) to a support member (e.g., the support structure 14). FIG. 4 shows the fastener 102 coupled to the faucet 12 and extending downwardly through an opening in the support structure 14. The connector 103 provides for quick coupling to the fastener 102 to secure the faucet to the support structure 14. The installer depresses the actuating portions 165 of one or both of the first and second locking members 161, 162 inwardly (i.e., toward the longitudinal axis LA) to move the nut assembly 106 (and the connector 103) to the non-locking position. In the non-locking position, the connector 103 slides over the fastener 102 from the non-securing position shown in FIG. 4 to the position shown in FIGS. 5 and 6, with the base 150 of the clip 105 contacting an underside of the support structure 14. As shown best in FIG. 6, the connector 103 freely slides over the fastener 102 in the non-locking position since the threads of threaded portions 164 of the locking members 161, 162 are at a diameter that is larger than the major diameter of the threads of the fastener 102.

Figure 7:
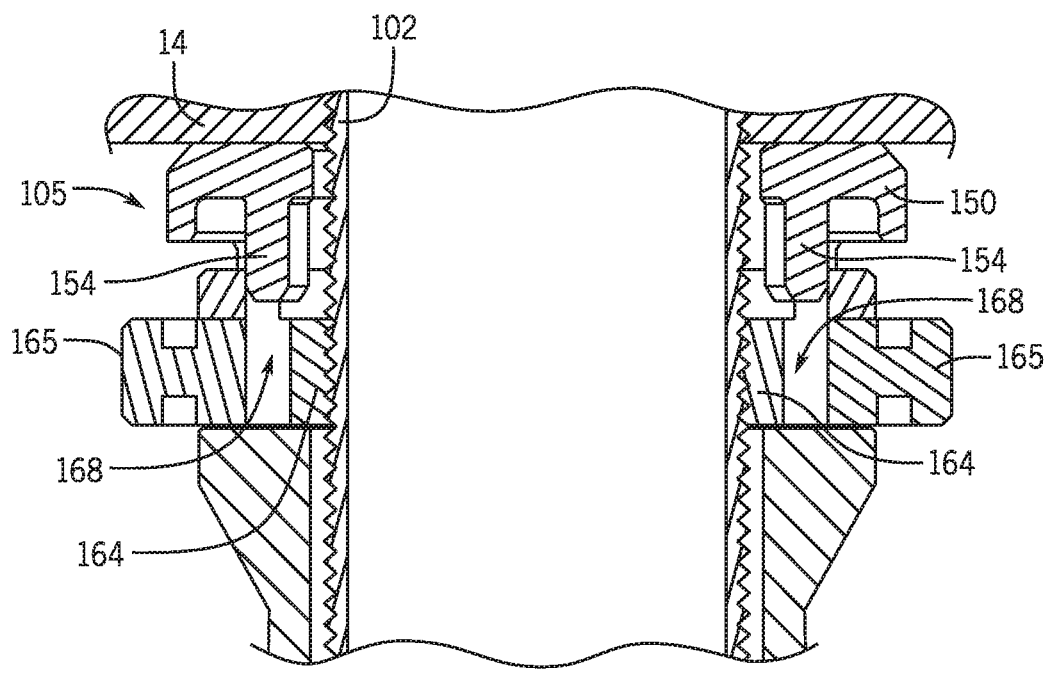
FIG. 7 is a side view of the faucet fixation system shown in FIG. 2 in a partially assembled position.

As shown in FIG. 7, upon locating the connector 103 in the desired position on the fastener 102 (e.g., with the clip 105 contacting the underside of the support structure 14), releasing the actuating portions 165 of the locking members 161, 162 moves the connector 103 into the locking position in which the threaded portions 164 of each locking member engage the threads of the fastener 102. The biasing force from one of the two springs 169 drives the threaded portion 164 of the first locking member 161 away from the actuating portion 165 of the second locking member 162 and dives the threaded portion 164 into engagement with the threads of the fastener 102. The biasing force from the other of the two springs 169 drives the threaded portion 164 of the second locking member 162 away from the actuating portion 165 of the first locking member 161 and dives the threaded portion 164 into engagement with the threads of the fastener 102. In the locking position, the threaded engagement prohibits the connector 103 from sliding movement (e.g., translation without rotation) relative to the fastener 102, while facilitating threaded rotation (e.g., helical movement) of the connector 103 along the fastener 102. Also shown in FIG. 7, the gap 168 between each nested threaded portion 164 and actuating portion 165 increases as the connector 103 moves from the non-locking position to the locking position.

Figure 8:
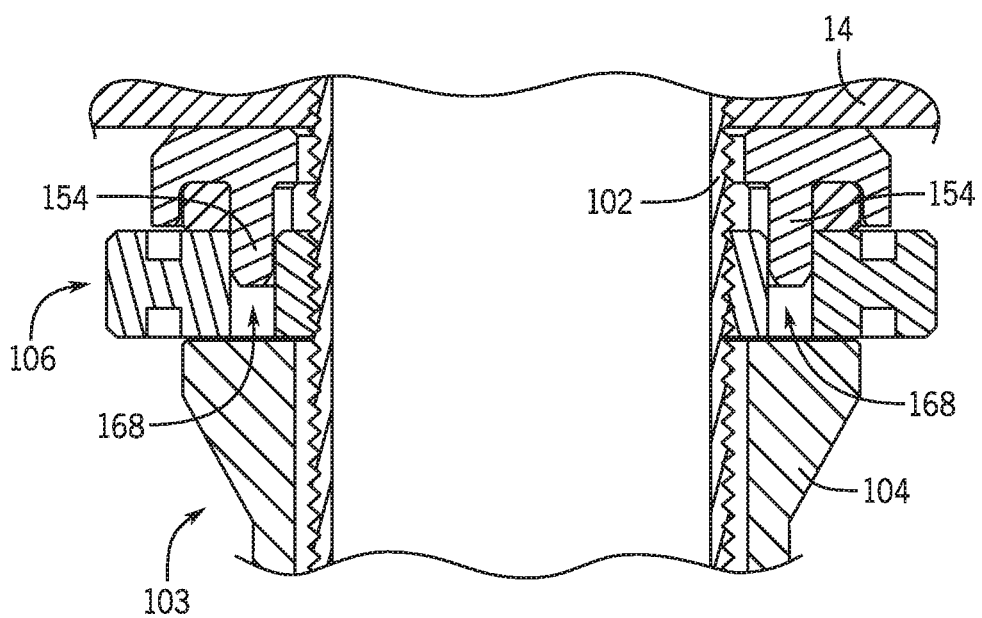
FIG. 8 is a side view of the faucet fixation system shown in FIG. 2 in a fully assembled position.

As shown in FIG. 8, rotation of the base 104 of the connector 103 relative to the fastener 102 while the connector 103 is in the locking position results in threaded rotation of the base 104 and the nut assembly 106 relative to the fastener 102, the clip 105 and the support structure 14. Such threaded rotation in a first rotational direction (e.g., clockwise) moves (e.g., threads, helical movement, etc.) the base 104 toward the clip 105 and the support structure 14, which results in at least one finger 154 of the clip 105 engaging the gap 168 to maintain the engagement of the threaded portion 164 of the associated locking member with the threads of the fastener 102 by blocking relative movement of the threaded portion 164 (and locking member) out of the locking position. Thus, the faucet is secured to the support structure 14 through the fastener 102 and connector 103. Threaded rotation of the base 104 in a second rotational direction (e.g., counterclockwise) moves the base 104 away from the clip 105, such as to decouple the connector 103 from the fastener 102 to allow the faucet to be removed, such as for repair or replacement.

The system 101 may optionally include a ring (e.g., centering ring, coupling ring, etc.) for locating and centering the faucet 12 in the hole 16 in the support structure 14. As shown in FIG. 2, a ring 20 includes an annular base that is disposed on the topside of the support structure 14. A faucet can be positioned on the ring 20 to locate the faucet centrally (e.g., concentrically) with the ring 20. The ring 20 includes an opening for receiving the fastener 102, and the ring 20 may include a flange that extends down from the bottom of the base into the hole 16 in the support structure 14.

FIGS. 9-12 illustrate another exemplary embodiment of a connector 204 (e.g., a quick connector) for use with a faucet fixation system to quickly couple/decouple a faucet to/from a support structure. As shown, the connector 204 includes a first half 205, a second half 206 pivotally coupled to the first half 205, and a spring 207 for biasing the first and second halves 205, 206 in a closing direction toward the locking position (shown in FIG. 10). The first and second halves 205, 206 are configured to pivot relative to one another between the locking position and a non-locking position (shown in FIG. 11) when manipulated by a user (e.g., installer).

As shown, the first half 205 includes an elongated generally semi-cylindrical body 250 extending from a first end 251 (e.g., lower end) to a second end 252 (e.g., upper end), which has a smaller diameter compared to a central portion of the body 250 between the ends. Extending through the body 250 is a bore 253 (e.g., channel) having a threaded portion 254, which extends from the second end 252 to a transition point 255, and a non-threaded portion 256, which extends from the transition point 255 to the first end 251 having an increasing diameter (e.g., the bore flares out at the first end). As shown in FIG. 12, a channel 257 is disposed in an outer surface of the body 250 (on a side opposite the internal threads), and the channel 257 is configured to receive a portion of the spring 207.

As shown in FIGS. 9-12, the second half 206 includes an elongated generally semi-cylindrical body 260 extending from a first end 261 (e.g., lower end) to a second end 262 (e.g., upper end), which has a smaller diameter compared to a central portion of the body 260 between the ends. Extending through the body 260 is a bore 263 (e.g., channel) having a threaded portion 264, which extends from the second end 262 to a transition point 265, and a non-threaded portion 266, which extends from the transition point 265 to the first end 261 having an increasing diameter (e.g., the bore flares out at the first end). As shown in FIG. 12, a channel 267 is disposed in an outer surface of the body 260 (on a side opposite the internal threads), and the channel 267 is configured to receive a portion of the spring 207.

Also shown in FIGS. 9-12, the first and second halves 205, 206 complement and cooperate with one another. The first and second halves 205, 206 are configured to pivot relative to one another, and to achieve this, the first half 205 includes a male half of a pivot joint shown in FIG. 9 as a semi-circular pivot flange 259 that rotates in a female half of the pivot joint shown in FIG. 9 as a semi-circular pivot collar 269. It should be appreciated that pivot flange 259 and pivot collar 269 could be switched to the second half and first half, respectively. The pivot joint is located proximate (e.g., just below) the transition points 255, 265 such that the threaded portions 254, 264 rotate away from one another when moving from the locking position to the non-locking position, which is discussed below in more detail.

As shown, the spring 207 is configured as an annular element that encircles a portion of each of the first half 205 and the second half 206. The spring 207 is retained in the channels 257, 267 of each half 205, 206, and the spring 207 provides a biasing force that acts to close the two halves (i.e., move the portions/channels of the halves toward one another) to bias the connector 204 toward the locking position.

Figure 13:
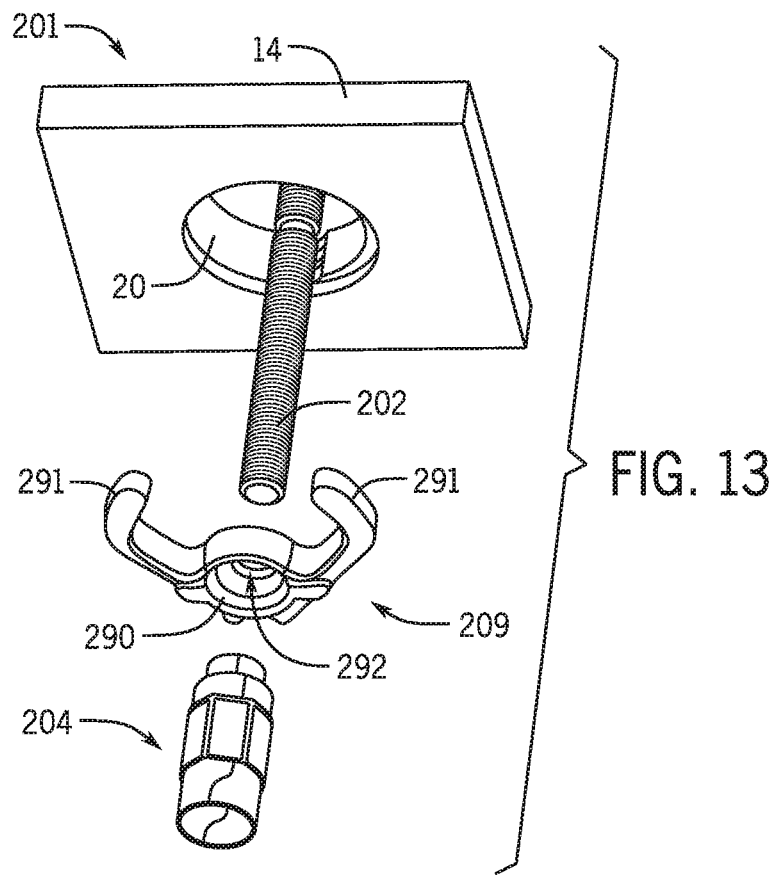
FIG. 13 is a perspective view of a faucet fixation system having the connector shown in FIG. 9 along with a holding flange and a fastener.

FIGS. 13-16 illustrate utilizing the connector 204 shown in FIGS. 9-12 with another exemplary embodiment of a faucet fixation system 201 to couple a faucet, such as the faucet 12, to a support structure 14. As shown in FIG. 13, the system 201 includes a fastener 202 coupled to a faucet (not shown), a holding flange 209 that is coupled (e.g., threaded, slideably coupled, etc.) to the fastener 202, and the connector 204 that is coupled to the fastener 202 to secure the faucet in place to the support structure 14. The system 201 may optionally include a ring 20 for locating the faucet in the hole in the support structure 14.

Also shown in FIG. 13, the holding flange 209 includes a generally annular body 290 with two arms 291 extending outwardly from opposite sides of the body 290. Each arm 291 is configured to contact an underside of the support structure 14 when assembled (see FIG. 14). An opening 292 is disposed in the body 290, which includes a portion to receive (e.g., a threaded portion to thread) to the fastener 202 and a bore portion that receives a portion of the connector 204.

Figure 14:
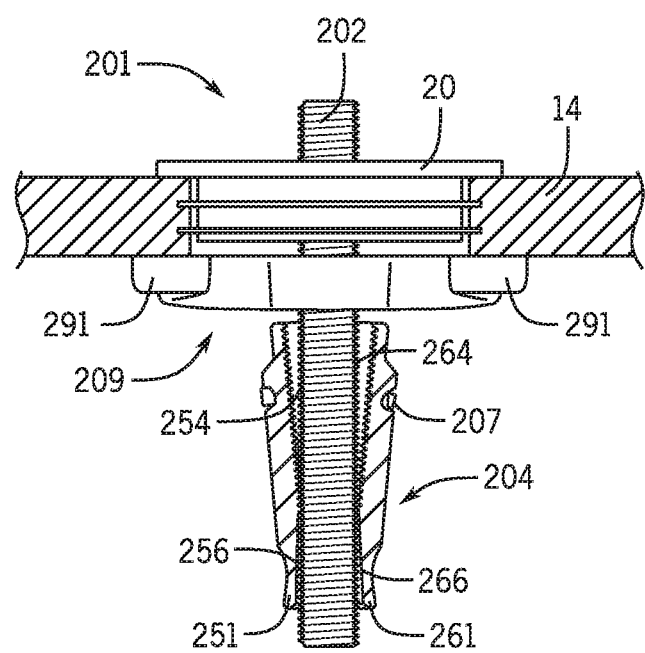
FIG. 14 is a cross-sectional side view of the faucet fixation system shown in FIG. 13 in a non-locking position.
Figure 15:
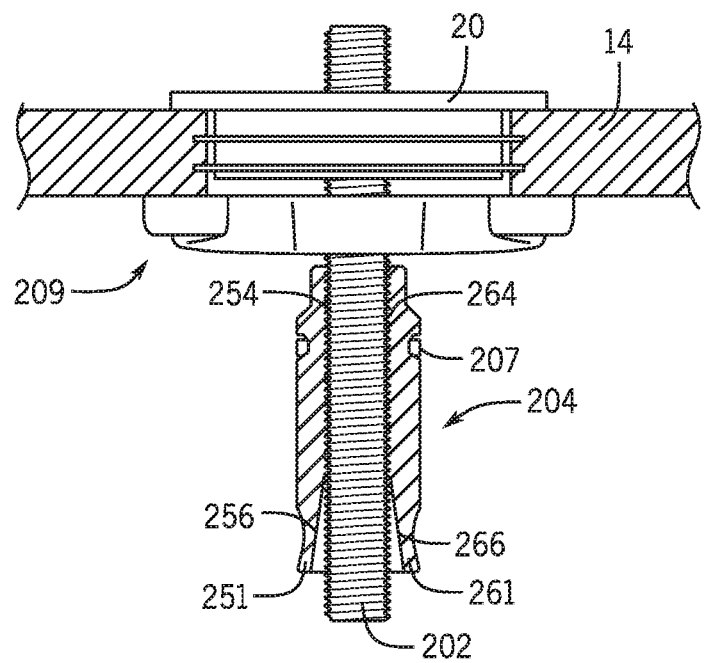
FIG. 15 is a cross-sectional side view of the faucet fixation system shown in FIG. 13 in a locking position.
Figure 16:
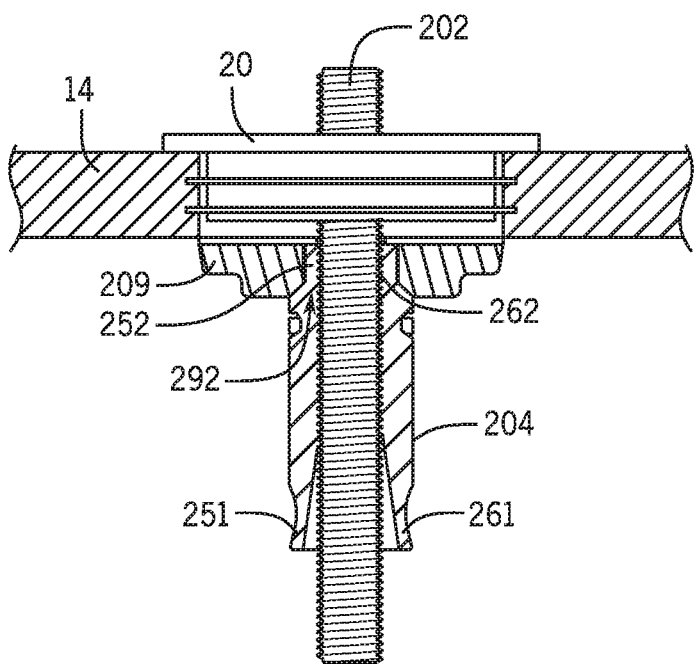
FIG. 16 is a cross-sectional side view of the faucet fixation system shown in FIG. 13 in a secured position.

FIGS. 14-16 illustrate an exemplary embodiment of a method of installing the connector 204 onto the fastener 202 for the system 201 to secure a faucet in place to the support structure 14. As shown in FIG. 14, a user (e.g., installer) depresses (e.g., pinches, squeezes, etc.) the first ends 251, 261 of the halves 205, 206 together to pivot the threaded portions 254, 264 away from one another and the non-threaded portions 256, 266 toward one another by pivoting about the pivot joint to place the connector 204 in the non-locking position. In the non-locking position, the threads of the halves 205, 206 clear the threads of the fastener 202 to allow the connector 204 to be moved (e.g., slid, translated) along the fastener 202 without having to thread the connector 204 and fastener 202 together. Hence, the connector 204 can be moved into position very quickly. As shown in FIG. 15, once the connector 204 is in the desired position (e.g., with the second ends 252, 262 proximate the bottom of the holding flange 209), the first ends 251, 261 are released, allowing the spring 207 to move the connector 204 into the locking position with the threaded portions 254, 264 of the halves 205, 206 in threaded engagement with the threads of the fastener 202. In the locking position, the connector 204 can rotate about the fastener 202 through the threaded engagement, but the threaded engagement prohibits sliding/translation of the connector 204 along the fastener 202. As shown in FIG. 16, while in the locking position, the connector 204 can be rotated in a securing rotational direction (e.g., clockwise) relative to the fastener 202 to move the connector 204 upward relative to the fastener 202 and the holding flange 209 so that the first ends 251, 261 engage the bore portion of the opening 292 to place the connector 204 in the secured locking position. In the secured locking position, the holding flange 209 prohibits the connector 204 from being moved from the locking position to the non-locking position, since the first ends 251, 261 are held in place by the body 290.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the faucet fixation systems as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., connectors, fasteners, holding flanges, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A faucet fixation system, comprising:
    a fastener configured to couple to a faucet and extend through a support structure for the faucet; and
    a connector comprising:
        a base having a longitudinal bore receiving the fastener and a radial bore extending transversely through the longitudinal bore; and
        a nut assembly disposed in the radial bore and around the fastener, wherein the nut assembly includes a first locking member, which has a first threaded portion and a first projection disposed on opposite sides of the fastener, and a second locking member, which has a second threaded portion and a second projection disposed on opposite sides of the fastener;
    wherein in a locking position of the connector, the first and second threaded portions engage threads of the fastener to prohibit relative sliding movement between the connector and the fastener in a longitudinal direction while allowing the connector to rotate along the threads of the fastener;
    wherein in a non-locking position of the connector, the first and second threaded portions disengage the threads of the fastener to allow movement of the connector relative to the fastener in the longitudinal direction; and
    wherein in moving from the non-locking position to the locking position, each threaded portion moves toward the fastener and each projection moves away from the fastener.

2. The system of claim 1, wherein each of the first and second locking members move independently of the other.

3. The system of claim 2, wherein the first and second locking members move in opposite directions in moving from the locking position to the non-locking position.

4. The system of claim 2, wherein the first and second threaded portions move toward one another in moving from the non-locking position to the locking position.

5. The system of claim 1, wherein the first and second locking members translate in a common plane.

6. The system of claim 1, wherein the first and second locking members are nested such that a portion of at least one of the first and second locking members engages the other of the first and second locking members.

7. The system of claim 6, wherein the first threaded portion nests with the second projection and the second threaded portion nests with the first projection.

8. The system of claim 7, further comprising:
a first spring disposed between the first threaded portion and the second projection to apply a biasing force trying to separate the first threaded portion and the second projection; and
a second spring disposed between the second threaded portion and the first projection to apply a biasing force trying to separate the second threaded portion and the first projection.

9. The system of claim 8, wherein each of the first and second springs is a leaf spring having an arcuate shape.

10. The system of claim 1, wherein the base comprises an upper portion and a lower portion that together define the radial bore between the upper and lower portions.

11. The system of claim 10, further comprising a securing clip having a base that is configured proximate to a bottom side of the support structure in a secured position of the faucet relative to the support structure, wherein the securing clip also has at least one finger that couples the securing clip to the connector.

12. The system of claim 11, wherein the at least one finger engages the lower portion of the base in the locked position of the connector.

13. The system of claim 10, wherein the radial bore has a rectangular cross sectional shape to allow each of the first and second locking members to slide within the radial bore in a radial direction.

14. A faucet fixation quick connector, comprising:
a base having a longitudinal bore, which extends along a longitudinal axis and is configured to receive a faucet fastener, and a radial bore, which extends in a radial direction;
a first locking member disposed in the radial bore and configured to move relative to the base in the radial direction, the first locking member comprising a threaded portion and a projection provided on opposite sides of the longitudinal axis; and
a second locking member disposed in the radial bore and configured to move relative to the base in the radial direction, the second locking member comprising a threaded portion and a projection provided on opposite sides of the longitudinal axis;
wherein in a locking position, the threaded portions of the first and second locking members are configured to secure the connector to the fastener to prohibit a movement of the connector relative to the faucet fastener in the longitudinal direction absent relative rotation between the faucet fastener and the first and second locking members;
wherein in a non-locking position, the threaded portions of the first and second locking members are configured to be disconnected from the fastener to allow free movement of the connector relative to the fastener; and
wherein each of the first and second locking members is moved from the locking position to the non-locking position by depressing the projection toward the fastener relative to the base.

15. The quick connector of claim 14, wherein the first and second locking members are nested such that a portion of at least one of the first and second locking members engages the other locking member.

16. The quick connector of claim 15, wherein the threaded portion of the first locking member nests with the projection of the second locking member, and wherein the threaded portion of the second locking member nests with the projection of the first locking member.

17. The quick connector of claim 14, wherein each of the first and second locking members moves independently of the other locking member.

18. A faucet, comprising:
a base configured to mount to a support structure;
a spout extending from the base;
a fastener having a first end and a second end, which is coupled to the base; and
a connector comprising:
a body having a longitudinal bore receiving the fastener and a radial bore extending transversely through the longitudinal bore; and
a nut assembly disposed in the radial bore and encircling the fastener, wherein the nut assembly includes a first locking member, which has a first threaded portion and a first projection disposed on opposite sides of the fastener, and a second locking member, which has a second threaded portion and a second projection disposed on opposite sides of the fastener;
wherein in a locking position of the connector, the first and second threaded portions engage threads of the fastener to prohibit relative sliding movement between the connector and the fastener in a longitudinal direction while allowing the connector to rotate along the threads of the fastener;
wherein in a non-locking position of the connector, the first and second threaded portions disengage the threads of the fastener to allow the connector to slide relative to the fastener in the longitudinal direction; and
wherein in moving from the non-locking position to the locking position, each threaded portion moves toward the fastener and each projection moves away from the fastener.

19. The faucet of claim 18, further comprising a securing clip proximate to a bottom side of the support structure in a secured position of the faucet relative to the support structure, wherein the securing clip has an annular base, which has a central opening for receiving the fastener, and a plurality of external fingers extending away from the annular base, which each finger extends around a portion of the body of the connector to couple to the clip and the body.

20. The faucet of claim 19, wherein the securing clip and the base are configured to sandwich the support structure therebetween, and the securing clip also include a plurality of internal fingers configured to engage the nut assembly in the locking position to help maintain engagement of threads of the first and second threaded portions with threads of the fastener.

* * * * *